Aug. 2, 1955 R. J. GREEN 2,714,428
ACCESSORY GEAR DRIVE LUBRICATING MEANS
Filed Sept. 1, 1951 2 Sheets-Sheet 1

*INVENTOR.*
RAYMOND J. GREEN
BY
*Hauke & Hardesty*
ATTORNEYS

United States Patent Office 2,714,428
Patented Aug. 2, 1955

2,714,428

ACCESSORY GEAR DRIVE LUBRICATING MEANS

Raymond J. Green, Muskegon, Mich., assignor to Continental Motors Corporation, Muskegon, Mich., a corporation of Virginia Application September 1, 1951, Serial No. 244,811

3 Claims. (Cl. 184—11)

My invention relates to an accessory gear case structure and more particularly a lubrication system for the accessory gear mechanism mounted in the accessory gear casing.

It has been found to be difficult to satisfactorily lubricate the accessory gear mechanism mounted in a gear case structure disposed or located at one end of the engine crankcase from the engine lubricating system. Generally, the present day engines employ an oil pressure system comprising generally drilled oil passages leading the oil under pressure to the various engine parts to be lubricated, and such systems are not suitable for expansion to satisfactorily lubricate these accessory gear mechanisms.

It is an object of my present invention to eliminate the lubricating difficulties had with these accessory gear mechanisms by providing a separate lubrication system embodied in the accessory gear casing, and which is effective to splash and otherwise circulate lubricating oil onto the gears of the accessory gear mechanism.

A further object of my present invention is to provide adequate and satisfactory lubrication of the accessory gear mechanism of an internal combustion engine by constructing an accessory gear casing having an independent lubricating system and which is operable to provide a novel splash lubrication system for the gears mounted therein, and to further provide for a novel metering system, whereby to provide adequate lubrication at all times during engine operation.

Figure 1:
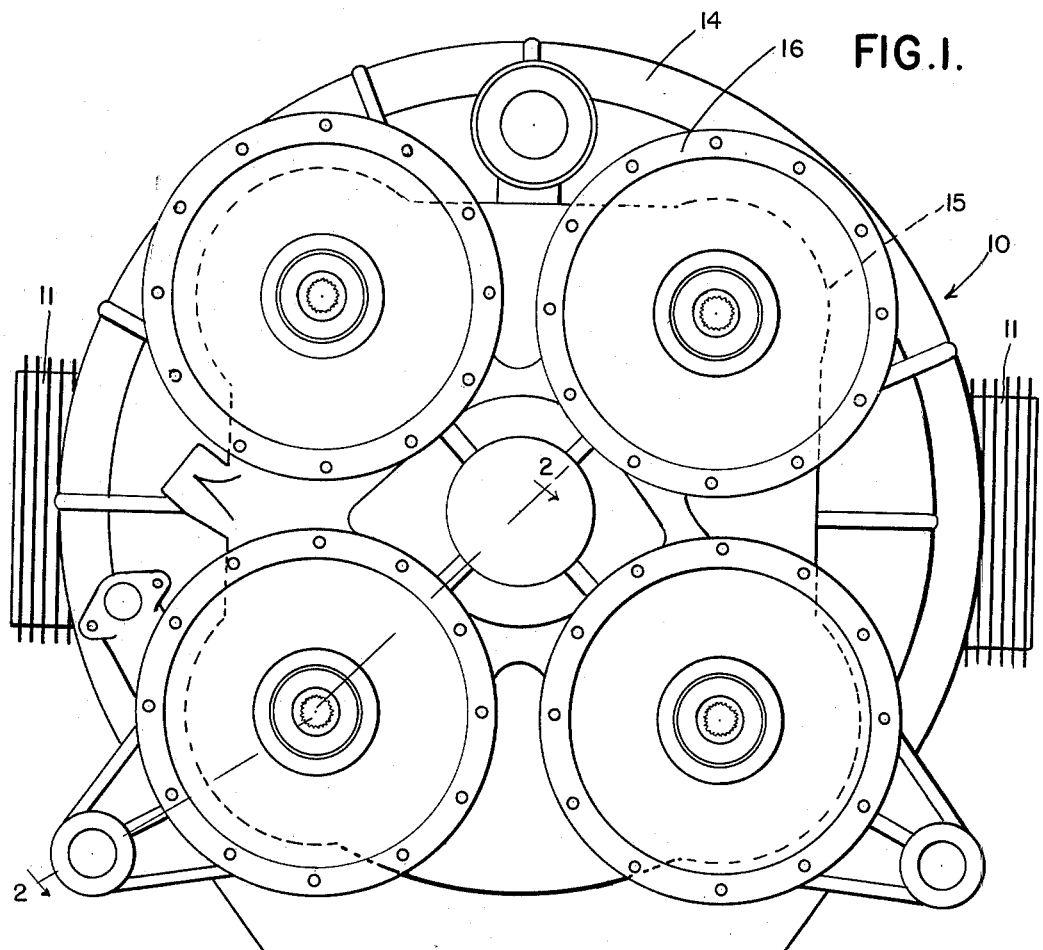

For a more detailed understanding of my invention reference may be had to the accompanying drawings illustrating a preferred embodiment thereof in which like parts are referred to by like characters throughout the several views, and in which Fig. 1 is an end view of the engine showing the accessory gear case in elevation.

Figure 2:
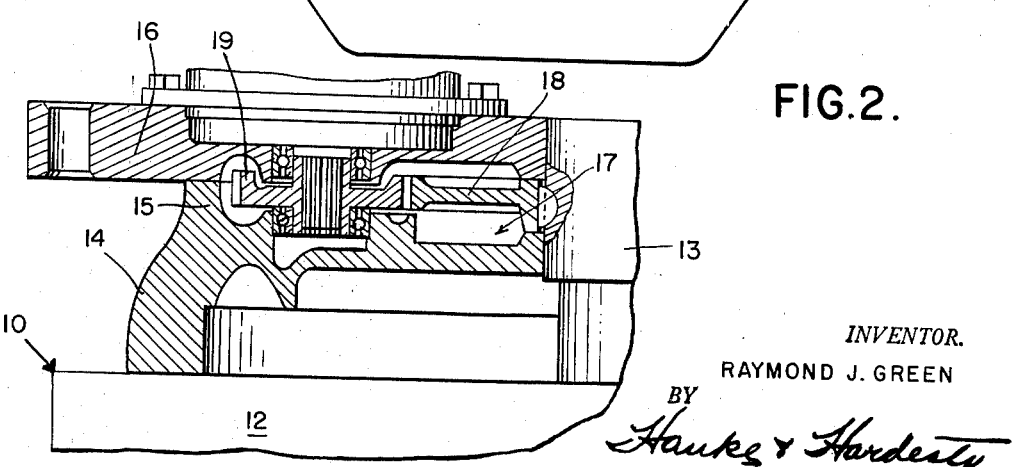
Figure 3:
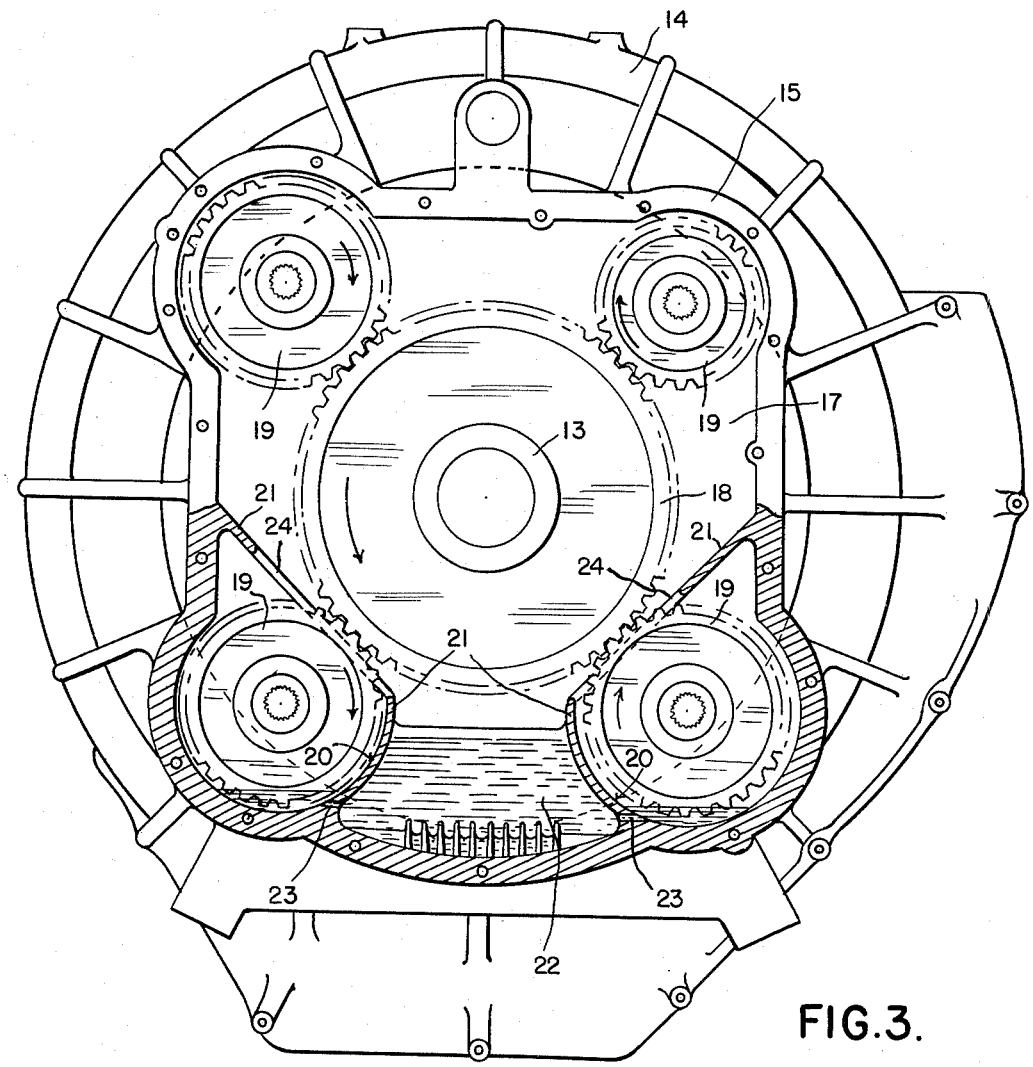

Fig. 2 is a fragmentary detail sectional view taken on the line 2—2 of Fig. 1, and Fig. 3 is an end elevational view of the gear case with the cover removed, and showing a part of said case in section.

The internal combustion engine 10, with which my present invention is associated, is a standard multi-cylinder engine, and the one particularly illustrated in the accompanying drawings has opposed horizontal cylinders 11, a crankcase 12 and a crankshaft 13. The present engine has a blower housing 14 secured to the end of the crankcase and an accessory casing 15 formed with the end of the blower housing, a cover 16 being further secured to the accessory casing.

The accessory casing portion 15 provides an accessory gear chamber 17 in which a driving gear 18 is centrally located and mounted on the end of the crankshaft 13. A plurality of driven gears 19 are also mounted within the casing 15 in said chamber 17 and preferably nested about and driven by the crankshaft driving gear 18.

It will be observed that the two adjacent lower gears 19 are each contained in a pocket 20 formed by the intermediate partition wall 21 and the casing. The partition walls 21 are constructed with sloping inwardly converging wall portions overlying the two lower gears 19 and serve to collect and drain oil dripping off said gears to a main oil sump 22 disposed in the lowermost part of this accessory casing, intermediate said two lowermost driven gears.

In order to lubricate these plurality of gears contained within the accessory casing, I provide a separate and distinct lubrication system therefor from the regular lubricating system of the engine proper. The pockets 20 provide auxiliary oil sumps which are provided with lubricating oil through the oil metering passages 23 in the lower portion of partition walls 21 connecting these pockets with the main oil sump 22. The sloping portions of the partition walls 21 are each provided with openings 24 overlying the gears 19 in the pockets 20, and the oil picked up by the gears 19 is splashed out through the openings 24 during the operation of the engine, and sprayed onto the driving gear 18 and the remaining gears 19. The oil metering openings or passages 23 are dimensioned to permit just the right amount of oil to be fed to the auxiliary oil sumps for being picked up by the gears 19 and splashed or sprayed over the other gears in the accessory casing. The oil drips off the gears and is drained into the main oil sump 22.

More particularly the oil dripping off said upper gears 19 and center gear 18, as well as oil from the walls of chamber 17 will drip into the main oil sump directly and from the inclined partition wall 21. The opening 24 is just wide enough to permit the lower gears 19 to project therethrough and mesh with gear 18. The oil on lower gears 19 is sprayed outwardly through openings 24 onto upper gears 19 and 18, as well as being carried by the gear teeth into direct contact with the teeth of gear 18.

While I have illustrated but one preferred embodiment of my invention, it will be apparent to those skilled in the art to which my invention pertains, that various modifications and changes may be embodied therein without departing from the spirit of my invention or from the scope of the appended claims.

I claim:

1. In an accessory gear case structure for an internal combustion engine having a crankcase and a crankshaft, an accessory casing secured to the crankcase, a driving gear mounted in said casing and drivingly secured to said crankshaft, and a plurality of driven gears mounted in said accessory casing and nested about and in mesh with the driving gear, said casing provided with intermediate partition walls providing pockets in which each of a pair of adjacent driven gears are mounted, each of said pockets providing an auxiliary oil sump, each of said partition walls provided with a metering oil passage directly connecting the pockets with the main oil sump and with an opening above the level of the oil in said main oil sump through which the driven gear projects to engage the driving gear and through which oil may be splashed by said driven gear from the auxiliary sump onto said driving gear and said other driven gears, the oil sumps in said accessory casing comprising a lubrication system independently separate from the engine lubrication system utilized to lubricate the engine parts other than said driving and driven gears aforesaid, said partition walls having converging sloping wall portions overlying the driven gears in said pockets and serving to collect and drain surplus oil into the main oil sump.

2. In an accessory gear case structure for an internal combustion engine having a crankcase and a crankshaft, an accessory casing secured to the crankcase and provided with a main oil sump, a driving gear mounted in said casing and drivingly secured to said crankshaft, and a plurality of driven gears mounted in said accessory casing and nested about and in mesh with the driving gear, said casing provided with intermediate sloping partition walls located at both sides of said main oil sump and coacting with the casing to provide pockets in which each of a pair of adjacent driven gears are mounted, each of said pockets providing an auxiliary oil sump, each of said partition walls provided with a metering oil passage directly connecting the pockets with the main oil sump and with an opening above the level of the oil in said main oil sump through which the driven gear projects to engage the driving gear and through which oil may be splashed by said driven gear from the auxiliary sump onto the said driving gear and said other driven gears, said partition walls each having a sloping wall portion disposed for the most part above the driven gears in said pockets and comprising a drainage system for collecting and draining surplus oil dripping from off said driving gear and said other driven gears into said main oil sump.

3. In an accessory gear case structure for an internal combustion engine having a crankcase and a crankshaft, an accessory casing secured to the crankcase, and having a main oil sump, a driving gear mounted in said casing and drivingly secured to said crankshaft, said driving gear disposed in its entirety above the level of the oil in said main oil sump, and a plurality of driven gears mounted in said accessory casing and nested about and in mesh with the driving gear, said casing provided with intermediate partition walls providing pockets in which each of a pair of adjacent driven gears are mounted, each of said pockets providing an auxiliary oil sump, each of said partition walls provided with a metering oil passage directly connecting the pockets with the main oil sump to provide for gravity flow of oil from the main oil sump to said auxiliary oil sump in which the driven gears mounted therein are partially submerged, and with an opening above the level of the oil in said main and auxiliary oil sumps, and through which the driven gear projects to engage the driving gear and through which oil may be splashed by said driven gear from the auxiliary sump onto said driving gear and said other driven gears, the oil sumps in said accessory casing comprising a lubrication system independently separate from the engine lubrication system utilized to lubricate the engine parts other than said driving and driven gears aforesaid, said partition walls each having a sloping wall portion above the said driven gears in said pocket and providing a drain for catching surplus oil from said driving and said other driven gears and returning said oil to said main oil sump.

References Cited in the file of this patent

UNITED STATES PATENTS

| | | |
|---|---|---|
| 1,220,810 | Alquist | Mar. 27, 1917 |
| 1,237,331 | Heaslet | Aug. 21, 1917 |
| 1,778,435 | Sperry | Oct. 14, 1930 |
| 1,839,623 | Waddell | Jan. 5, 1932 |
| 1,931,993 | Niven | Oct. 24, 1933 |

FOREIGN PATENTS

| | | |
|---|---|---|
| 290,225 | Great Britain | Sept. 13, 1928 |